US012639319B1

(12) United States Patent     (10) Patent No.:   US 12,639,319 B1
Chagas et al.     (45) Date of Patent:     May 26, 2026

(54) CONTINUAL WEIGHTED RETRIEVER FOR RAG-BASED SYSTEMS

(71) Applicant: Dell Products L.P., Round Rock, TX (US)

(72) Inventors: Eduarda Tatiane Caetano Chagas, Maceió (BR); Jonathan Mendes De Almeida, Brasília (BR); Luiz Fernando Sommaggio Coletta, Rio Claro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/037,397

(22) Filed: Jan. 27, 2025

(51) Int. Cl.
   *G06F 16/2457*     (2019.01)
   *G06F 16/93*     (2019.01)
   *G06N 5/022*     (2023.01)

(52) U.S. Cl.
   CPC ........ *G06F 16/24578* (2019.01); *G06F 16/93* (2019.01); *G06N 5/022* (2013.01)

(58) Field of Classification Search
   CPC .... G06F 16/24578; G06F 16/93; G06N 5/022
   See application file for complete search history.

(56) References Cited

U.S. PATENT DOCUMENTS 12,393,597 B1 *   8/2025   Rolland ................ G06F 16/248
2025/0217403 A1 *   7/2025   Saeedi ................. G06F 16/383

OTHER PUBLICATIONS

Lewis, P., et al., "Retrieval-Augmented Generation for Knowledge-Intensive NLP Tasks." arXiv, Apr. 12, 2021.
Liu, "LlamaIndex", https://github.com/jerryjliu/llama_index, Nov. 2022.
De Lange, Matthias, et al. "A continual learning survey: Defying forgetting in classification tasks." arXiv:1909.08383v3, 2021.
Lopez-Paz, David, and Marc'Aurelio Ranzato. "Gradient episodic memory for continual learning." Advances in neural information processing systems 2017.
Chaudhry, Arslan, et al. "Efficient lifelong learning with A-Gem." arXiv:1812.00420 (2018).
Kirkpatrick, James, et al. Overcoming catastrophic forgetting in neural networks. arXiv; 1612.00796v2 (2017).

* cited by examiner

*Primary Examiner* — Hau H Hoang
(74) *Attorney, Agent, or Firm* — Workman Nydegger

(57) ABSTRACT

A retrieval augmented generation (RAG)-based system is disclosed that is configured to perform weighted retrieval, weighted augmentation, and weighted generation. A continual learning based predictor model is trained to infer weights that correspond to sources in a knowledge base based on an input query. When a new source is added, synthetic questions and answers are generated such that the predictor model can be retrained to learn the new source. When documents are retrieved from a knowledge based, original rankings can be re-ranked based on the inferred weights. This weighted retrieval ensures that more relevant documents are provided as context to a prompt, which prompt is input to a large model. The predictor model allows the RAG-based system to adapt to changes in the knowledge base and maintain performance.

20 Claims, 8 Drawing Sheets

700

Memory
702

NVRAM
704

Processor
706

Application(s)
714

Storage Media
708

UI Device
710

Data Storage
712

CONTINUAL WEIGHTED RETRIEVER FOR RAG-BASED SYSTEMS

TECHNOLOGICAL FIELD OF THE DISCLOSURE

Embodiments disclosed herein generally relate to large models (LMs) that include retrieval augmented generation (RAG). More particularly, at least some embodiments relate to systems, hardware, software, computer-readable media, and methods for weighted retrieval, weighted augmentation, and weighted generation for RAG-based large language model (LLM) systems.

BACKGROUND

Large models, including large language models, can perform a wide variety of tasks and are used in an increasing number of applications. Some tasks, however, are more difficult than others. For example, Open-Domain Question Answering (ODQA) is a challenging task that involves using LLMs to answer a wide range of questions. While LLMs are capable of answering questions on a wide range of topics, their knowledge is limited to a parametric memory induced by public and dated datasets (for instance, ChatGPT was initially limited to data before September 2021). When datasets are added to the knowledge of the LLM, extensive retraining may be required, which is time consuming and costly.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Figure 1:
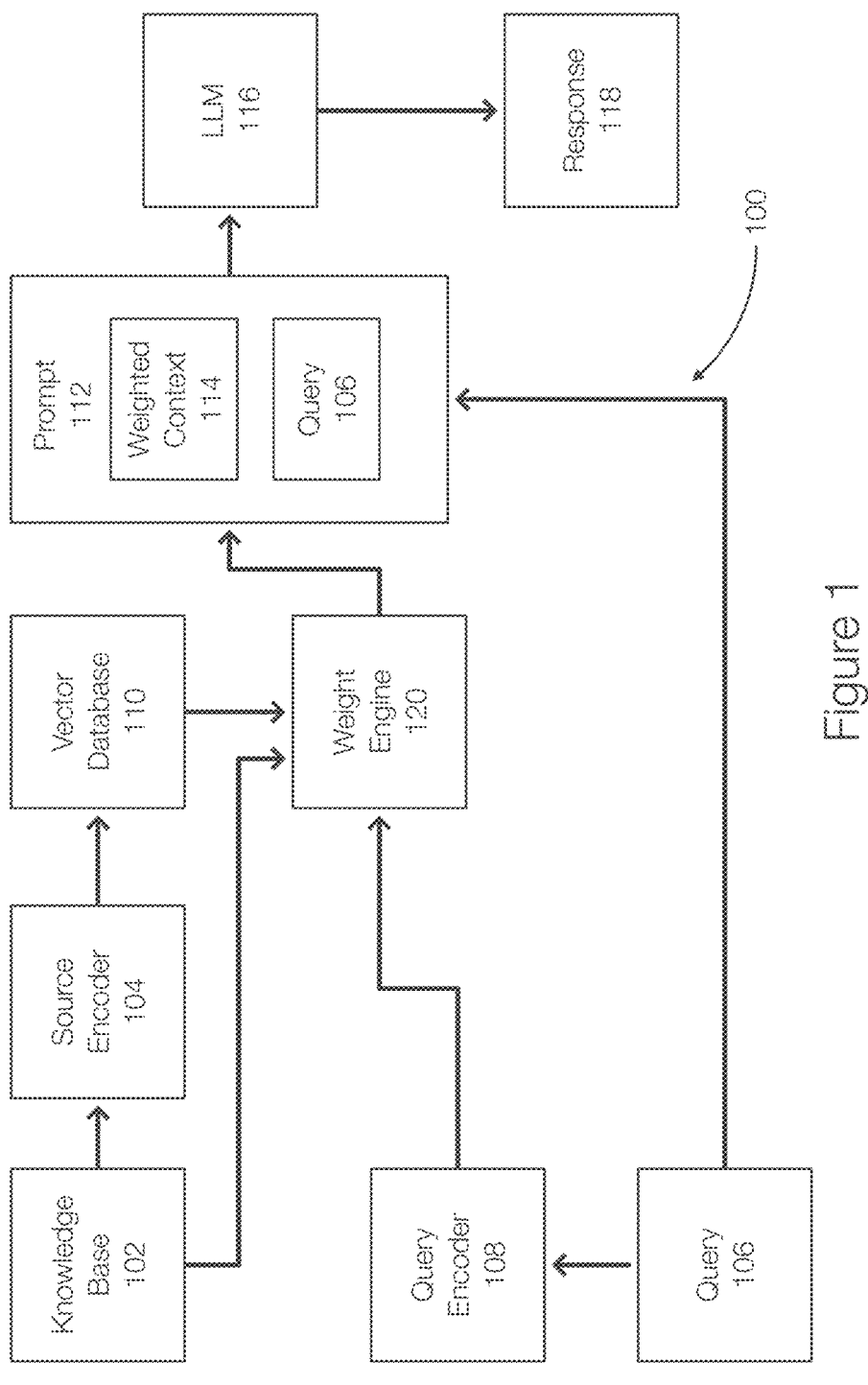
FIG. 1 discloses aspects of a retrieval augmented generation (RAG)-based system that includes weighted retrieval, weighted augmentation, and weighted generation.

Embodiments disclosed herein generally relate to retrieval augmented generation (RAG) based systems. More particularly, at least some embodiments relate to systems, hardware, software, computer-readable media, and methods for weighted retrieval, weighted augmentation, and weighted generation in an RAG-based system.

Large Models (LMs), such as LLMs, are models that can understand and generate human language by predicting the likelihood of word sequences or generate text based on a given input. LLMs are advanced LMs with massive parameter sizes and exceptional learning capabilities. One characteristic of LLMs is the ability to generate text based on a given context or prompt. This in-context feature enables LLMs to generate coherent and relevant responses. This makes LLMs highly suitable for interactive and conversational applications, such as chat assistants (LLM-based system/chatbots), question/answer systems, and the like.

Although LLMs can generate answers on a wide range of topics, their knowledge is limited to a parametric memory induced by (public) dated datasets. RAG-based LLM systems improve the ability of LLMs to generate answers that are based on knowledge that was not a part of training the LLM.

An RAG framework may equip an LLM with a non-parametric memory that allows LLM-based applications to tap into or access external data on which the LLMs were not trained. This enables the use of up-to-date, private, or other data to be used to specialize an LLM for specific contexts/domains without having to retrain the LLM for those specific contexts/domains.

RAG-based systems typically operating in stages that include retrieval, augmentation, and generation. The retrieval stage typically includes retrieving documents from a knowledge base. The augmentation stage includes building a prompt that includes the query and aspects of the retrieved documents. The generation stage includes inputting the prompt to an LLM to generate a response to the query.

The retrieval stage may be performed by a retriever. The retriever is configured to search external data, such as an external knowledge base, for data that may be relevant to an input query. The relevant data retrieved by the retriever is then passed, along with the query, to the LLM. This permits the LLM to generate a more coherent and informative response or answer that is based on potentially more relevant data or context.

The components behind the retrieval and generation stages of a RAG-based system may include pre-trained models. Specifically, the retrieval stage includes or is associated with a model configured to transform documents in the knowledge base into embeddings or other representations. The embeddings are stored in vector database. When retrieving documents from the knowledge base, a query is embedded and the query embedding can be compared to the embeddings in the vector database. The most relevant documents are the documents that are most similar to the query. Similarity may be measured by a metric such as cosine similarity, Euclidian distance, or the like. This allows the retriever to retrieve relevant documents that will enrich the response of the LLM.

RAG-based systems advantageously minimize the need to continuously train the LLM on new data and/or adjust its parameters according to the context/domain. This also advantageously reduces the computational and financial costs of inserting LLMs into an entity's solutions or applications, while making the LLMs personalized and more adherent to the domain in which they operate.

Even though RAG-based systems can provide significant advantages and allow LLMs to be adapted to specific contexts/domains, the retrieval stage does not always return the most relevant documents. More specifically, new data may be added to a systems knowledge base. Because the retriever is typically fixed, the ability of the retriever to retrieve the most relevant documents may decrease as data from other domains are added to the knowledge base.

More specifically, the retriever (retriever unit or component) of a RAG-based system is typically configured a priori and is fixed. For example, a RAG-based system may be fixed in terms of expert experience on the available domain-specific data and the encoder that generate embeddings may be adapted accordingly. However, these configurations are based on documents in the knowledge base that are available at that time. As the external knowledge database evolves over time, other data sources or databases may be added/considered. The addition of new data may adversely impact the performance of the fixed retriever, which may not be able to retrieve the new data, may misunderstand the new data, and/or may incorrectly mix documents from different sources. In effect, the retrieval stage becomes less reliable in the long term.

Embodiments of the invention improve the retrieval stage by providing the ability to prioritize documents using continual learning methods. Embodiments of the invention are configured to align the retriever with the dynamic nature of the external knowledge base. The ability to dynamically align the retriever to accommodate changed to the knowledge base improves performance of the RAG-based system, including the retriever, and helps ensure that the documents retrieved by the retriever are reliable for augmentation/generation tasks.

Embodiments of the invention relate to selecting the most relevant indexed documents in the vector database, to improve the augmentation/generation process in RAG-based system. More specifically, embodiments of the invention relate to continual learning in the context of document or data retrieval by the retriever. Embodiments of the invention may include a ranking operation that can adapt to the expansion of knowledge (e.g., insertion of new data sources into the external knowledge base). This allows performance to keep pace with the flow of new sources or databases into the knowledge base of the RAG-based system. As new databases are added, the vector database is updated and the retriever is also updated. In one example, because the retriever may include a continual learning model, the retriever can be trained to adapt to new data without catastrophic forgetting.

Embodiments of the invention dynamically infer or predict weights and associated with databases present in the knowledge base (and in the vector database). By determining weights in terms of each input query, embodiments of the invention do not interfere with the retrieval methodology adopted by the RAG-based system. Embodiments of the invention can be implemented with various embedding-based retrieval strategies. In one example, embodiments of the invention may be configured to predict a weight for each source, domain, or database in the knowledge base. Documents identified by the retriever may be ranked according to similarity and embodiments of the invention perform weighted retrieval by re-ranking the retrieved documents using the inferred or predicted weights.

In one example, a predictor model (predictor) is configured to infer or predict weights. Continual Learning (CL), also known as Lifelong Learning, Sequential Learning, or Incremental Learning, is a machine learning paradigm that aims to learn new tasks continuously and adaptively by adding knowledge (plasticity) to the model without catastrophically forgetting the previously acquired knowledge (stability). Unlike traditional architectures that focus on solving a single task at a time, CL allows a single model to be trained to perform many tasks using less computational power and model storage.

CL is often divided in three scenarios: task-incremental, domain-incremental, and class-incremental learning. In task-incremental learning, the model is informed about which task needs to be performed requiring models with task-specific components. In domain-incremental learning, different tasks have the same classes, but input distributions are different. Finally, in class-incremental learning, the model learns to discriminate a growing number of classes. Each task contains different classes, and the algorithm learns to distinguish between all classes. Embodiments of the invention can accommodate each of these CL scenarios. For example, if different sources or databases within the knowledge base are viewed as different classes, the predictor can infer or predict the more relevant sources or databases and adapt as new databases/domains are added to the knowledge base.

In addition, CL algorithms typically employ one of the following strategies: regularization, episodic memory, or parameter isolation. Regularization strategies avoid storing raw data from previous tasks adding an extra regularization term in the training loss function to prevent catastrophic forgetting. Algorithms that use episodic memories (from raw data or with pseudo-samples built from generative models) replay stored samples from previous tasks while learning a new task (also known as rehearsal). Parameter isolation is an architecture approach that adds a set of parameters to each task with the idea that different tasks should have their own set of isolated parameters. Example CL algorithms, capable of solving class-incremental learning problems, with a combination of regularization and rehearsal are Gradient Episodic Memory (GEM) and Averaged GEM (A-GEM). For the same scenario, another typical and successful algorithm based on regularization solely is Elastic Weight Consolidation (EWC).

FIG. 1 discloses aspects of a RAG-based system with weighted retrieval, weighted augmentation, and weighted generation. The RAG-based system 100 includes a vector database 110 configured to store vectors (e.g., text embeddings in vector form). In this example, documents from data sources (domains databases) included in the knowledge base 102 are encoded by a source encoder 104 to generate embeddings or vectors stored in the vector database 110. A query 106 may similarly be converted into a vector or an embedding by a query encoder 108 (may be the same encoder as the source encoder 104). This allows the query 106 to be compared to the documents in the data sources 102 using the embeddings. The most similar documents, based on the comparison of the query embedding (vector) with the embeddings (vectors) in the vector database 110, are included in a prompt 112 as context 114. Thus, the prompt 112 is enhanced with the context 114 and includes both the query 106 and the context 114. The prompt 112 may be input to an LLM (Large Language Model) 116, which generates a response 118 to the query 106.

More specifically, the RAG-based system 100 includes a weight engine 120. In this example, the query embedding is compared to embeddings in the vector database 110 to identify documents that are relevant to the query 106. Documents retrieved from the knowledge base 102 (or their embeddings) are input to the weight engine 120 along with the query 106 (or its embedding).

Advantageously, the prompt 112 can be constructed with a weighted context 114. More specifically, when a user submits the query 106, the RAG-based system 100 retrieves documents that specifically relevant from the knowledge base 102, which may include authoritative knowledge sources or other relevant data sources. The weight engine 120 allows the documents retrieved in response to the query to be weighted or re-ranked. This allows the weighted context 114 to be generated in a manner that includes documents that are more relevant. In one example, the prompt 112 is thereby enhanced with the weighted context 114 and provides details beyond what the LLM 116 already knows or has learned or has access to from other sources. In contrast to traditional LLMs that rely solely on their training data, the RAG-based system 100 allows the LLM to incorporate real internal data (e.g., the data sources in the knowledge base 102) and provide responses or answers that are more accurate and context aware. The weight engine 120 allows the RAG-based system to account for databases that are added to the knowledge base 102.

The response 118, for example, may depend on the existence of data in an external knowledge base, on the granularity of the retriever and context prompt, and on the generator.

FIGS. 2A, 2B, 2C, and 2D disclose aspects of weighted retrieval, weighted augmentation, and/or weighted generation. The method 200 may be implemented by the weight engine 120 in FIG. 1 and may be implemented in phases. The method 200 in FIG. 2A includes (i) a weighted retrieval phase 202 and (ii) a weighted augmentation and generation phase 210. In this example, the weighted retrieval phase 202 includes a weights predictor training phase 204 and a continual weighted retrieval phase 206.

Figure 2A:
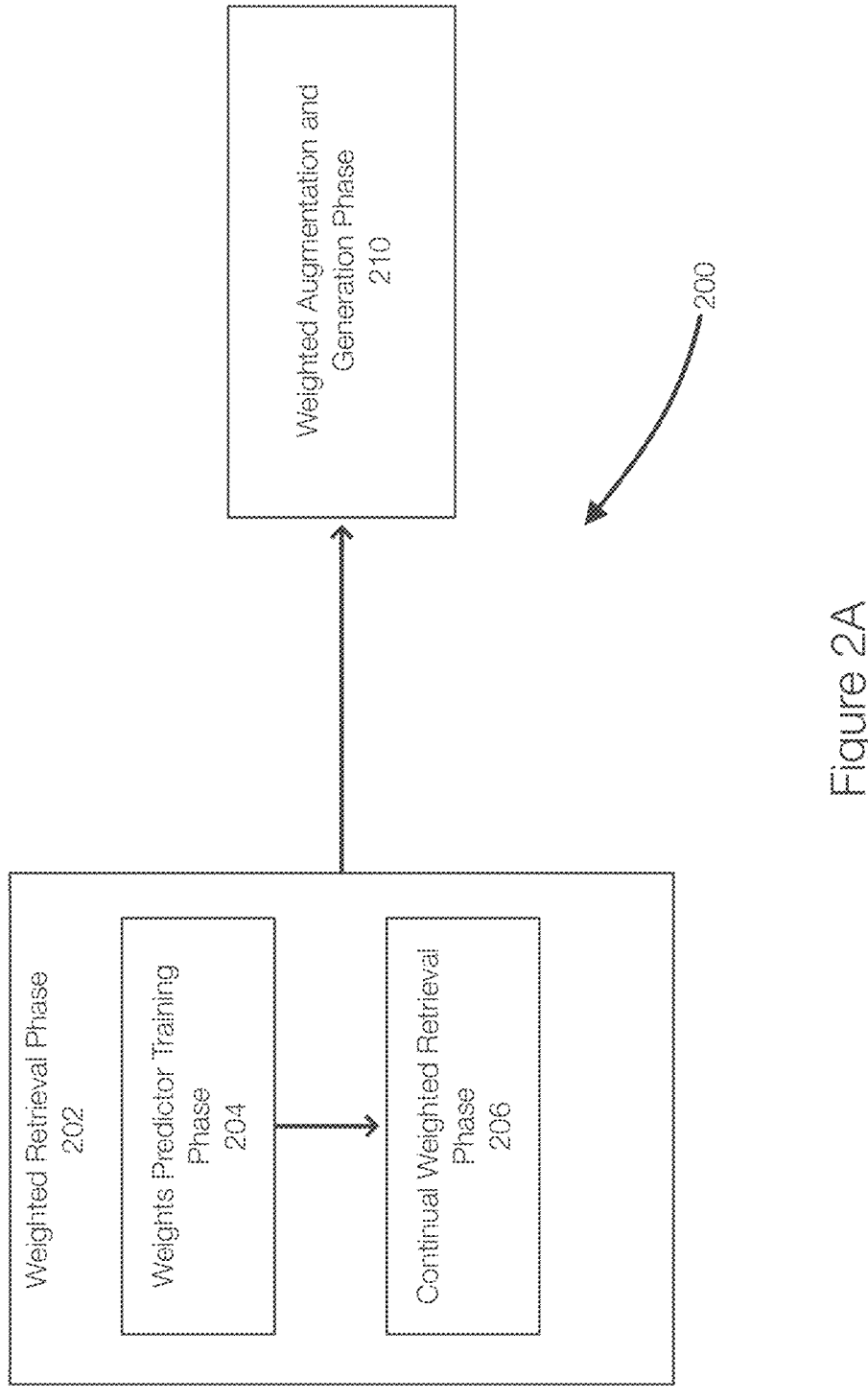
FIGS. 2A-2D disclose additional aspects of weighted retrieval, weighted augmentation, and weighted generation.
Figures 2B, 2C, 2D:
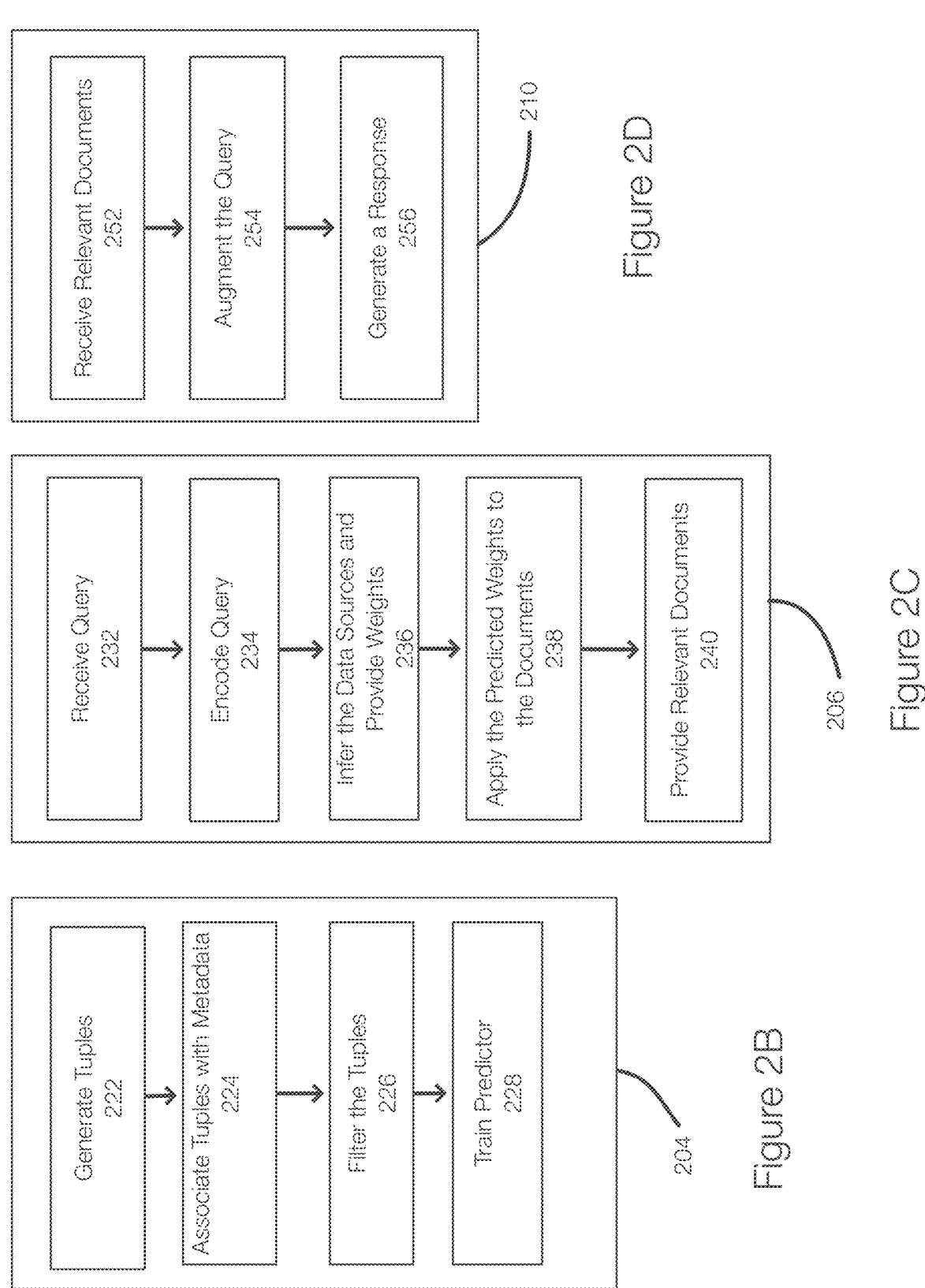

FIG. 2B illustrates additional aspects of the weight's predictor training phase 204. The phase 204, which is typically performed when new databases or sources are added to the knowledge base, includes generating 222 tuples of questions and answers (QA) based on documents that may come from different sources in the knowledge base of the RAG-based system. A dataset of tuples is formed by associating 224 each QA tuple with metadata that includes the related identifiers (IDs) of the corresponding data sources. The phase 204 thus generates tuples that are each associated with specific sources or databases within the knowledge base.

The QA tuples generated during the phase 204 are filtered 226 to keep or identify the QA tuples related to a specific (e.g., new) data source. QA tuples identified in this manner includes tuples that may also be associated with other sources. Encoded questions (the embeddings) from the filtered dataset and corresponding metadata (as a target) are used to train (retrain) 228 a continual learning model (a predictor). Once trained, the predictor is configured to infer or predict the data sources or domains within the knowledge base that relate to an input query. Documents retrieved by the retriever can be reprioritized using the predicted weights.

FIG. 2C discloses aspects of the continual weighted retrieval phase 206. The phase 206 relates to responding to a query received into the RAG-based system. In the continual weighted retrieval phase 206, a query is received 232 from a user. The query is encoded 234 to generate a query embedding. Based on the query embedding, the related data sources are inferred 236 and given weights by the predictor trained in the weights predictor training phase 204. The corresponding predicted weights are applied 238 on the documents retrieved by the retriever and the top K-latent documents are identified or provided 240 to the augmentation stage of the RAG-based system. This allows a weighted ranking to be performed on the retrieved documents.

Once the documents are retrieved by the retriever using a weighted retrieval phase, a weighted augmentation and generation phase 210 is performed as illustrated in FIG. 2D. The most relevant latent documents, identified by the phase 206, are received 252. As previously discussed, the relevant documents were selected based on the input query and the predicted weights. Next, the query is augmented 254. In other words, the prompt is constructed based on the re-ranked documents (or selected excerpts) retrieved by the retriever, which are related to the query. A generator model (e.g., an LLM) provides or generates 256 a response based on the augmented prompt.

In one example, the method 200 simply repeats the weighted augmentation and generation phase 210 as new queries are received. However, if additional or new sources are added to the external knowledge base, the phase 204 may be performed such that the predictor is trained with respect to the new sources.

The weight engine 120 may include a CL model or mechanism that improves the performance of the RAG-based system 100 by allowing the RAG-based system 100 to be aware of and account for updates to the knowledge base over time. When vector databases are fed with new document embeddings from new data sources, the CL model associates weights to the sources (or documents) to adjust the relevance of the sources during retrieval. This mechanism balances the importance of the documents or sources in terms of the relationship between input queries and new (data) sources or domains included in or added to the knowledge base 102. Embodiments of the invention thus relate to a retriever (a RAG retrieval component) that controls relationships between outdated and updated documents, including those from different domains or sources (e.g., technology versus agriculture). The inferred weights of the sources may also express a mix of domains (e.g., when to answer about plant disease detection using drones). This enriches the context for augmentation and subsequent generation operations in the RAG-based system. Embodiments of the invention also make the RAG-based system 100 more flexible and agile by minimizing human intervention whenever the knowledge base is updated, changed, increased, or the like.

Embodiments of the invention relate to a RAG framework or system configured to adapt to changes in the knowledge base. This advantageously avoids performance degradation when changes occur in the knowledge base. During a retrieval operation, embodiments of the invention establish or determine dynamic weights for the retrieved documents in accordance with the input query and the updated knowledge base. In one example, a CL model is provided and is configured to learn newly added sources that may reflect new domains, up-to-date or other supplementary information in a manner that automatically balances the importance of the documents during retrieval.

Figure 3:
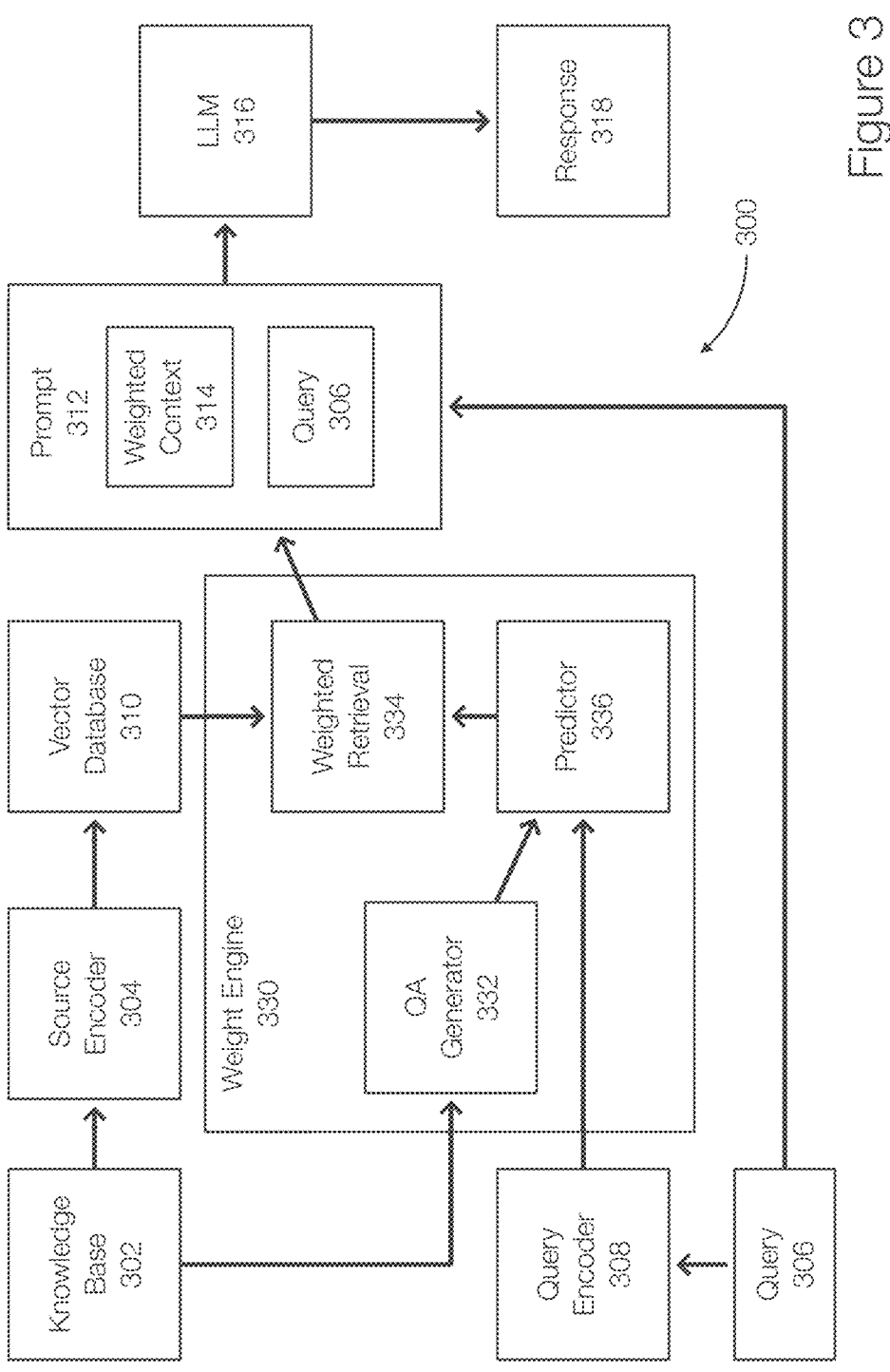
FIG. 3 discloses aspects of a RAG framework with weighted retrieval, augmentation, and generation operations.

FIG. 3 discloses aspects of a RAG-based system that includes weighted retrieval, weighted augmentation, and/or weighted generation operations. The RAG-based system 300 includes a knowledge base 302 (e.g., data or document sources). Over time, additional sources/domains/databases, which may include sets of documents, may be added to the knowledge base 302. The knowledge base 302 is therefore dynamic in natures and subject to change. The source encoder 304 is configured to generate embeddings for the documents in the knowledge base 302 and store the embeddings in the vector database 310.

A query 306 may be received into the system 300. The query 306 is encoded by the query encoder 308 (which may be the same as the source encoder 304) to generate a query embedding. More specifically, the encoders 304 d(z) and 308 q(x) are examples of pre-trained models configured to generate embeddings from documents and queries. The embeddings are representations of documents already stored in the vector database 310. Based on similarities between the query 306 the documents in the knowledge base 302 (or similarities between their embeddings or representations), a portion (K) of these documents are ranked to serve as context to enrich the operation of generating the response 318 or answer to the query 306.

In FIG. 3, the weight engine 330 allows a prompt 312 to be constructed that includes a weighted context 314 and the query 306. The prompt 312 is input to the LLM 316 and weighted generation is performed, using the augmented prompt 312, to generate the response 318.

The weight engine 330 illustrates various phases related to weighted retrieval. In this example, the weights retrieval phase 202 includes the weights predictor training phase 204. The phase 204 occurs when new data sources are added to the knowledge base 302. In the phase 204, a QA generator 332 may generate a synthetic question and answer dataset from the knowledge base, including the new sources. The synthetic question and answer dataset is used to train or retrain the predictor 336, which may be a CL model and is trained using a CL training method.

More specifically, the phase 204 includes (i) generating a synthetic dataset considering a new data source added to the knowledge base; and (ii) using this dataset to (re) train a machine learning model (the predictor 336), taking into account a CL method that keep the predictor 336 up to date with the current knowledge base 302.

The continual weighted retrieval phase 206 is configured to employ the predictor 336 to infer the weights of documents retrieved by the retriever of the RAG-based system 300 based on the query 306. In one example, the weights inferred by the predictor 336 are generated on a per source manner. The weights for each source can be applied to documents retrieved from those resources. Thus, the weight inferred for and applied to documents retrieved from a first source may be different from the weight inferred for and applied to documents retrieved from a different source in the knowledge base.

The phase 210 (weighted augmentation and/or weighted generation) is configured to augment the query 306 with excerpts from the top K documents after applying the inferred weights. The selection of the top K documents is therefore influenced by the predicted weights.

In one example, the synthetic questions and answers are generated by the generator 332. A context augmentation method, such as provided by LlamaIndex, is an example of a generator 332 configured to generate QA tuples from sources, including new sources, in the knowledge base 302.

Thus, the output of the generator 332 includes tuples of:

Question: generated synthetically;

Answer: generated synthetically; and

Reference source: metadata to indicate which data source was used to generate the corresponding question.

In one example, the reference source is a tuple of D scorings (between 0 and 1), where D is the total number of data sources (distinct domains) present in the knowledge base (the sum of all elements in the reference source should be one). For example, consider that the knowledge base 302 includes three data sources, $d_1, \ldots, d_3$, and that a specific QA was generated based on $d_1$ and $d_3$. In this case, the reference source tuple will be [0.5, 0.0, 0.5]. Similarly, a question generated from a single data source, for example, $d_2$, it will have the tuple [0.0, 1.0, 0.0]. In terms of the number of documents referenced from each data source, unbalanced tuples can also be formed, e.g.: [0.3, 0.1, 0.6].

Figure 4:
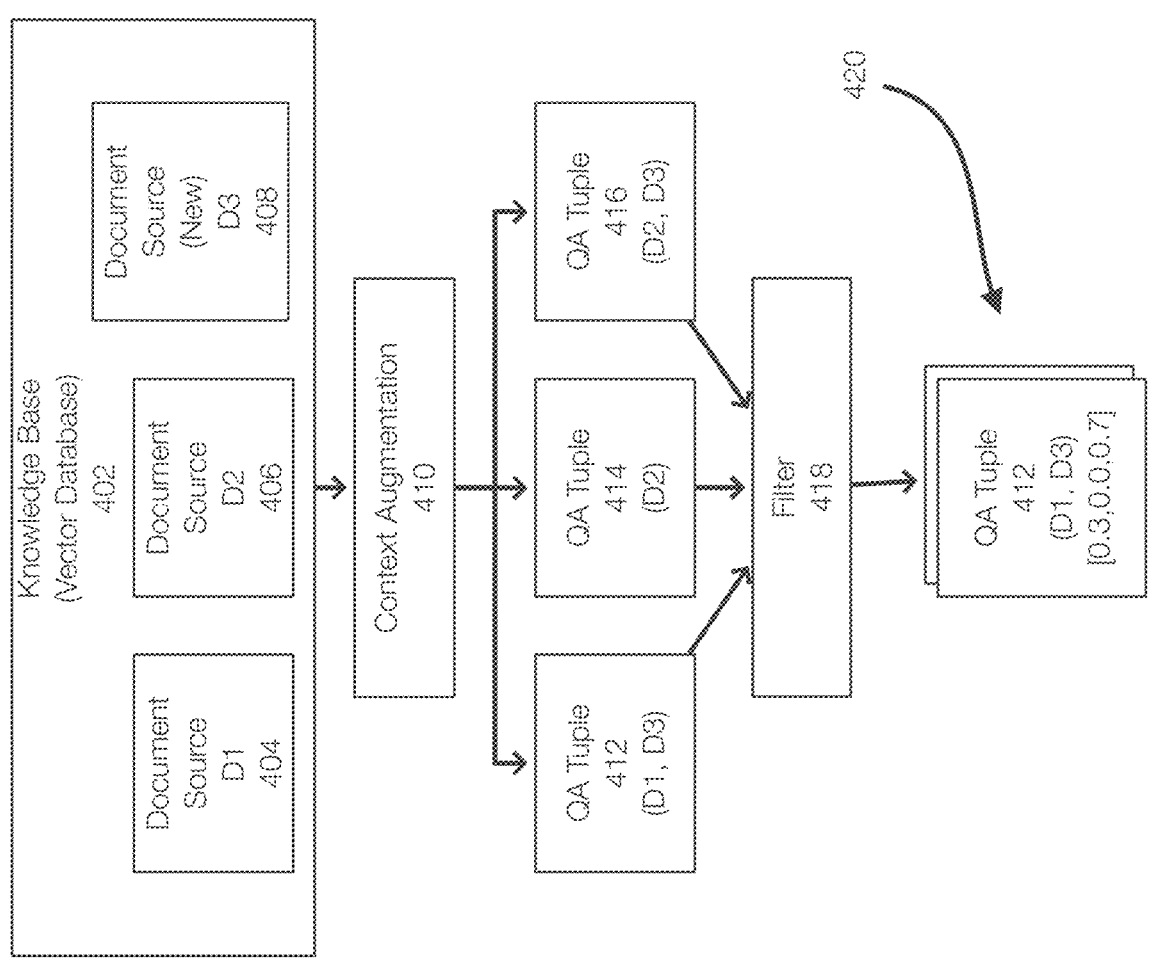
FIG. 4 discloses aspects of generating synthetic data for training a predictor.

FIG. 4 discloses aspects of generating synthetic data for training a predictor. FIG. 4 more specifically illustrates aspects of generating synthetic QA tuples and of filtering the tuples to generate a dataset suitable for training or retraining a predictor. FIG. 4 illustrates a knowledge base 402 (or represents the corresponding vector database) that includes documents sources 404, 406, and 408. In this example, the document source 408 is newly added to the knowledge base 402 and triggers the retraining operation.

In this example, context augmentation 410 (e.g., the generator 332) generates synthetic QA tuples 412, 414, and 416. Each tuple includes a question, an answer, and a reference source (metadata). In the context of adding the new document source 408 to the knowledge base 402 and updating or retraining the predictor, the filter 418 is used to filter the QA tuples 412, 414, and 416. More specifically, the filter 418 is configured to identify tuples that include or are drawn from the new document source 408. As noted by the metadata, the tuples 412 (drawn from D1 and D3) and the tuple 416 (drawn from D2 and D3) both refer to the new document source 408.

Stated differently, only tuples whose reference source includes a non-zero entry for the new document source 408 are output or identified by the filter 418. Thus, the filter 408 outputs or identifies a dataset 420 that includes, in this example, the tuples 412 and 416 (e.g., the reference source for the tuple 412 is [0.3, 0.0, 0.7]). In one example, the filter may only output N tuples or instances. Optionally, user input may be used to select the best instances from the dataset 420 for training the predictor.

Once the dataset 420 is generated by the filter 418, the dataset 420 is used to train or retrain the predictor. The predictor is trained to infer the document sources used to generate the input question. Because the document sources are included in the metadata, the predictor can use the metadata as a target during training. More formally, the predictor is a function, $f(\cdot)$, capable of continually learning different domains through a training process in which a CL algorithm is employed.

More specifically, the knowledge of $f(\cdot)$ (the predictor) is enlarged by learning new domains. In this example, the training dataset 420 is composed by encoded questions (X) from the dataset generated by the QA Generator or context augmentation 410 in conjunction with the corresponding reference source tuple (Y). For example, considering the first generated question in FIG. 4 (the tuple 412), the CL algorithm will receive an input vector xi, that is the $QA_1$ question encoded by the query encoder to teach $f(\cdot)$ to output its reference source, $y_i=(0.3, 0.0, 0.7)$. After training, $f(\cdot)$ or the predictor will be able to receive an encoded query from the query encoder and predict or infer weights. In one example, the inferred weights are the D scores for each reference source. Thus, the output of the predictor may have a format similar to the D scores of the tuples. The D scores included in the inferred weights for the query can be used to re-rank the retrieved documents or to reprioritize the documents when generating context for the prompt.

Figure 5:
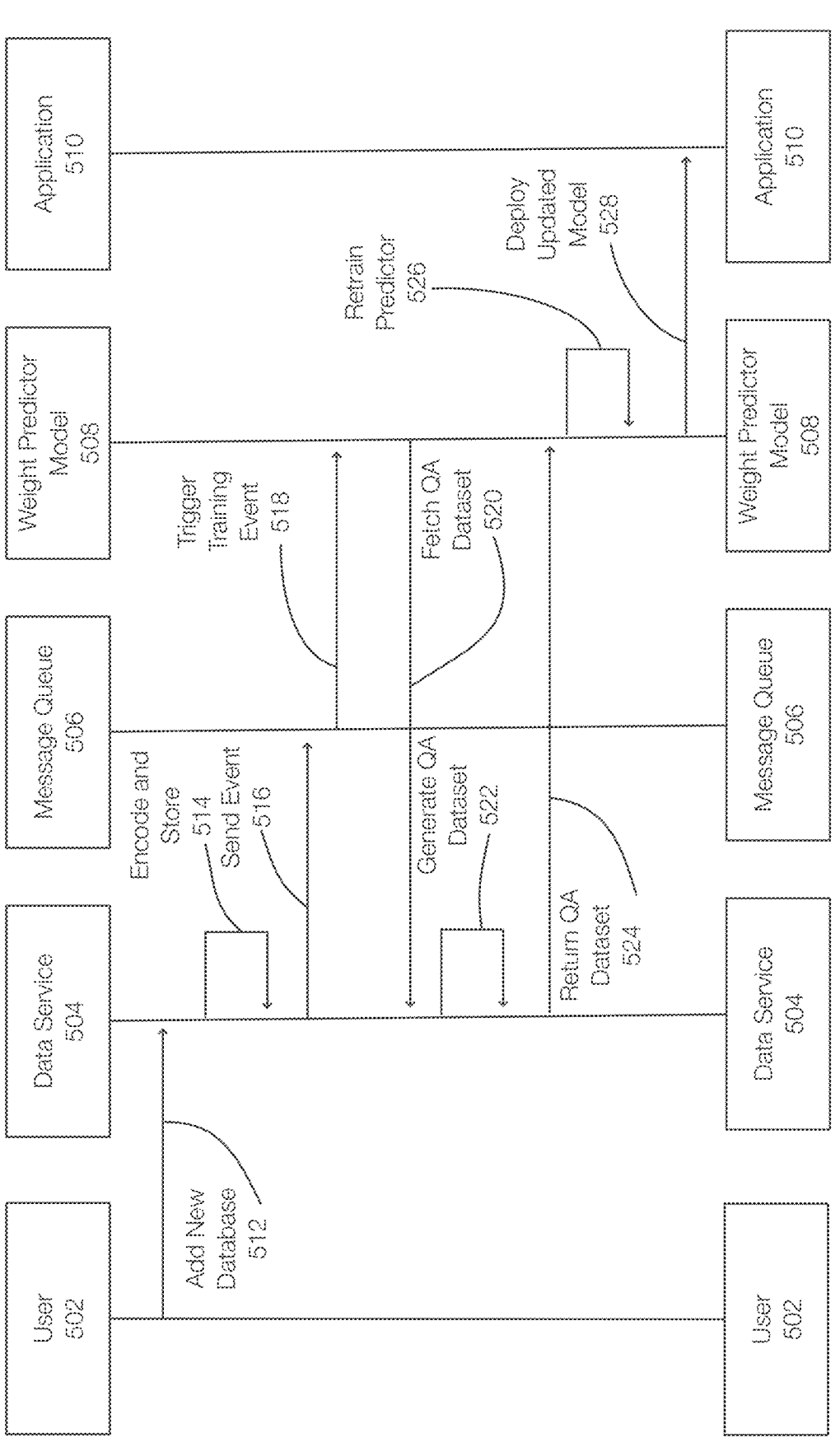
FIG. 5 discloses additional aspects of adding a new database or data source to a knowledge base of a RAG-based system.

FIG. 5 discloses aspects of adding a new database (e.g., document source) to a knowledge base. The system flow illustrated in FIG. 5 is typically initiated by the user 502 when a new database or document sources is added to the knowledge base of the RAG-based system. The data service 504 is a component of module responsible for (i) encoding and storage data or documents in the new data source in the vector database, and (ii) generating questions and answers. The weight predictor model 508 (predictor 508) is an example of a continual learning based model responsible for query-domain mapping. In effect, a trained predictor maps an input query to document sources in the knowledge base. The application 510 may be a RAG-based system that is configured to retrieve and generate data based on a query provided by a user.

More specifically in this example, a user 502 may add 512 a new database to a data service 504, which adds the new database to the knowledge base. The data service 504 may encode and store 514 the encodings (embeddings) in a vector database. Once completed, an event 516 is sent to a message queue 506. Receipt of the message may trigger a training event 518 for the weight predictor model 508 (the predictor).

In this example, a request 520 to fetch or obtain a training dataset for training purposes is generated. The data service 504 may generate 522 a training dataset as described in FIG. 4. The QA dataset generated by the data service 504 is then returned 524 to the predictor 508 and the predictor is retrained 526. Once the training or retraining operation is completed, the updated predictor is deployed 528 to the application 510 and used during at least retrieval operations.

The example of FIG. 5 illustrates a retraining operation where each addition to the knowledge base triggers a model retraining. The message queue 506 manages and handles the triggered events, and allows asynchronous event communications. These features enable scalability and suitability for real-time applications.

Figure 6:
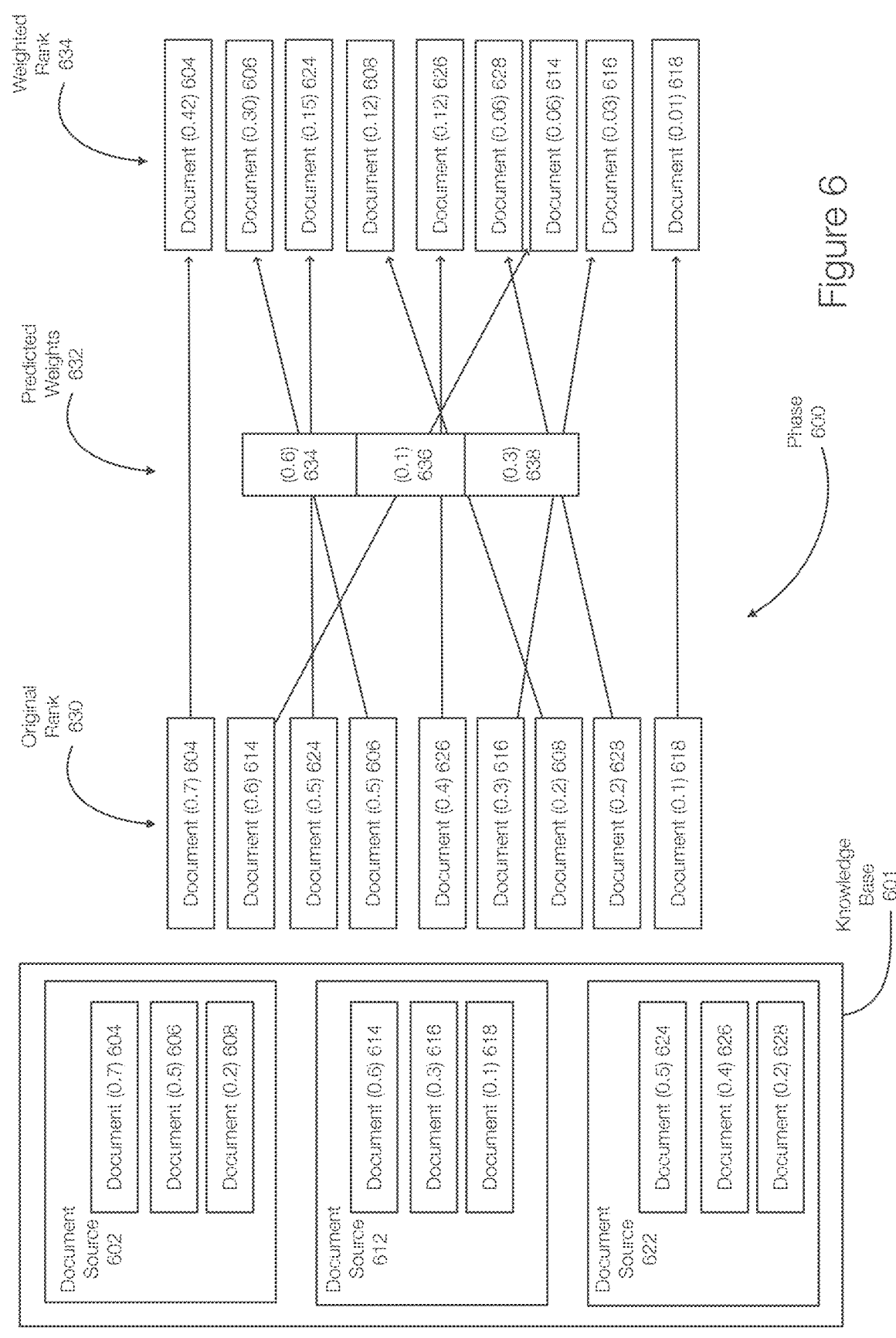
FIG. 6 discloses additional aspects of continual learning based weighted retrieval.

FIG. 6 discloses additional aspects of continual weighted retrieval performed using the predictor. FIG. 6 illustrates an example of a phase 600, which is an example of the phase 206. In one example, documents from a knowledge base are encoded and their embeddings or representations are stored in a vector database. In one example, a predictor has been trained and is current with respect to the content or databases included in the knowledge base. In this example, the knowledge base 601 includes three document sources: document sources 602, 612, and 622.

In this example, a query is received and encoded by a query encoder to generate a query embedding. The query or query embedding is provided as input to the predictor to generate predicted weights 632. The predicted weights 632 includes a weight for each of the document sources 602, 612, and 622 (a document score D) for the specific query. In other words, the output of the predictor may change and is based on the query.

The query may be used to retrieve a set of K documents from the knowledge base 601. In this example, three documents are retrieved from each of the sources 602, 612, and 622. The documents retrieved based on comparing the query embedding to the embeddings in the vector database include documents 604, 606, 608 from the source 602, documents 614, 616, and 618 from the source 612, and documents 624, 626, and 628 from the source 628. In practice, the number of documents retrieved from each of the sources may be different.

The original rank 630 of these documents may be a similarity score (identified in parentheses in FIG. 6). Thus, the documents retrieved based on the query are ranked according to their similarity score from (0.7) to (0.1). These similarities or similarity values are then refined using the predicted weights 632. Thus, the documents are re-ranked. In one example, the documents are re-ranked by multiplying the original rank (similarity value) with the corresponding predicted weight. For example, documents from the source

602 are multiplied by the weight 634). Thus, using multiplication, documents 604, 606, and 608 from the source 602 are multiplied by a weight 634 of (0.6), documents 614, 616, and 618 from the source 612 are multiplied by a weight 636 of (0.1), and documents 624, 626, and 628 are multiplied by a weight 638 of (0.3).

This demonstrates an example where the weights predicted by the predictor correspond have a format similar to the reference source metadata. As previously stated, the predictor is trained using sources as targets. Thus, the predictor infers or predicts which sources are likely to be more relevant to the query and have a correspondingly higher weight. Thus, a new weight is determined for each of the documents from each of the sources in the knowledge base 601 retrieved by the retriever.

Applying the weights re-ranks the documents to generate a new weighted rank 634. The arrows in FIG. 6 represent how the documents were re-ranked and the new values (priority values) are included in parenthesis. For example, the document 614, having an original rank of 2 and a similarity value of 0.6, is re-ranked with a ranking of 7 and a score of (0.06). The original ranks 630 are changed by the predicted weights 632 to generate new ranks or re-ranks.

More specifically in one example, the top K documents are retrieved from each source by the retriever, which is distinct from simply retrieving the K most similar documents from the knowledge base 601. Reranking the documents using the predicted weights 632 refines the retrieval process of the RAG-based system by considering contexts (e.g., sources) that are more related to the input query and avoiding the insertion of contexts from domains that are less related to the input query.

The predictor, in one example, is trained to generate weights that identify the sources that are more likely to contain more relevant documents. More relevant documents are prioritized by re-ranking the document. When performing weighted augmentation, the new rankings allow documents with a higher relative importance to be reflected in the weighted context included in the prompt.

In one example, embodiments of the invention provide a continual learning mechanism used to infer source or collection weights based on the input query. This allows documents to be retrieved and/or prioritized in terms of their relevance to the query. One benefit of the proposed framework is related to the continual learning mechanism used to infer the collections/documents' weights based on a given query. In other words, embodiments of the invention allow each query to be evaluated independently while accounting for the possibility of relevant documents that may be present in sources added to the knowledge base.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, RAG-based operations, weighted retrieval operations, weighted augmentation operations, weighted generation operations, knowledge base related operations, (re) training operations, training dataset generation operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data storage, data protection, and other services may be performed on behalf of one or more clients. Some example cloud computing environments in which embodiments may be employed include Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' or 'document' is intended to be broad in scope. Example embodiments are applicable to any system capable of storing and handling various types of objects, in analog, digital, or other form. Synthetic documents and/or corresponding labels are examples of data or objects.

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method for performing a retrieval augmented generation (RAG) operation in a RAG-based system, the method comprising: retrieving documents from one or more sources included in a knowledge base based on a query, performing a weighted retrieval phase that is configured to re-rank the documents retrieved from a knowledge base based on inferred weights generated by a predictor model, augmenting a prompt with the weighted documents such that the prompt includes a weighted context and the query, and generating a response to the query based on the prompt.

Embodiment 2. The method of claim 1, further comprising generating a query embedding from the query and comparing the query embedding with embeddings stored in a vector database to identify the documents retrieved from the knowledge base, wherein the retrieved documents include the documents that are most similar to the query.

Embodiment 3. The method of embodiment 1 and/or 2, wherein the predictor model comprises a continual learning based model.

Embodiment 4. The method of embodiment 1, 2, and/or 3, wherein an original rank of each of the retrieved documents comprises a similarity score representing a similarity between the query and the corresponding retrieved document.

Embodiment 5. The method of embodiment 1, 2, 3, and/or 4, further comprising inferring the weights by inputting the query or a query embedding into the predictor model, wherein the output of the predictor model comprises an inferred weight for each of the sources in the knowledge base.

Embodiment 6. The method of embodiment 1, 2, 3, 4, and/or 5, further comprising re-ranking the documents by multiplying each similarity score with a weight in the inferred weights that corresponds to the source of each of the documents.

Embodiment 7. The method of embodiment 1, 2, 3, 4, 5, and/or 6, further comprising retraining the predictor model.

Embodiment 8. The method of embodiment 1, 2, 3, 4, 5, 6, and/or 7, further comprising, when a new source is added to the knowledge base, generating tuples that each include a synthetic question, a synthetic answer, and a reference source, wherein the reference source for each tuple is metadata that identifies which of the sources in the knowledge base contributed to the tuple.

Embodiment 9. The method of embodiment 1, 2, 3, 4, 5, 6, 7, and/or 8, further comprising filtering the tuples such that a training dataset includes only tuples whose reference source references the new source added to the knowledge base.

Embodiment 10. The method of embodiment 1, 2, 3, 4, 5, 6, 7, 8, and/or 9, further comprising retraining the predictor model using the training dataset and deploying the retrained predictor model to an application.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These May be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 7:
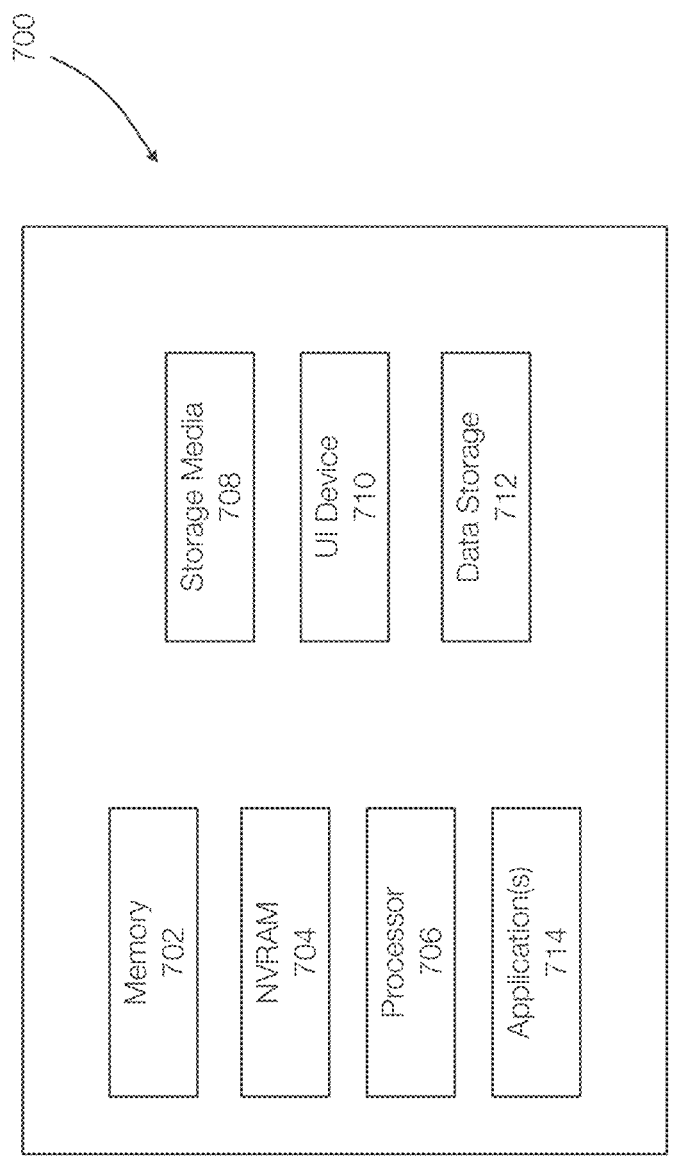
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

The device 700 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 700 may also represent a physical or virtual machine or server, an edge-based computing system, a cloud-based computing system, server clusters or other computing systems or environments. The device 700 may also represent multiple machines or devices, whether virtual, containerized, or physical. The device 700 may perform or execute steps or acts of the methods illustrated in the Figures.

The device 700 may represent a cloud-based system, an edge-based, system, an on-premise system, or combinations thereof. Weighted retrieval, augmentation, and generation operation, RAG-related operations, and related operations may be performed using these types of computing environments/systems.

The described embodiments are to be considered in all respects only as illustrative and not restrictive. All changes which come within the meaning and range of equivalency of the claims are to be embraced within their scope.

What is claimed is:

1. A method for performing a retrieval augmented generation (RAG) operation in a RAG-based system, the method comprising:

retrieving documents from one or more sources included in a knowledge base based on a query;

performing a weighted retrieval phase that is configured to re-rank the documents retrieved from a knowledge base based on inferred weights generated by a predictor model, wherein the inferred weights comprise per-source weights that correspond to individual sources in the knowledge base and are inferred by the predictor model from the query or a query embedding; and augmenting a prompt with the weighted documents such that the prompt includes a weighted context and the query wherein augmenting the prompt includes selecting top-K documents after applying the per-source weights to similarity scores of the retrieved documents; and generating a response to the query based on the prompt.

2. The method of claim 1, further comprising generating a query embedding from the query and comparing the query embedding with embeddings stored in a vector database to identify the documents retrieved from the knowledge base, wherein the retrieved documents include the documents that are most similar to the query.

3. The method of claim 1, wherein the predictor model comprises a continual learning based model.

4. The method of claim 1, wherein an original rank of each of the retrieved documents comprises a similarity score representing a similarity between the query and the corresponding retrieved document.

5. The method of claim 4, further comprising inferring the weights by inputting the query or a query embedding into the predictor model, wherein the output of the predictor model comprises an inferred weight for each of the sources in the knowledge base.

6. The method of claim 5, further comprising re-ranking the documents by multiplying each similarity score with a weight in the inferred weights that corresponds to the source of each of the documents.

7. The method of claim 1, further comprising retraining the predictor model.

8. The method of claim 7, further comprising, when a new source is added to the knowledge base, generating tuples that each include a synthetic question, a synthetic answer, and a reference source, wherein the reference source for each tuple is metadata that identifies which of the sources in the knowledge base contributed to the tuple.

9. The method of claim 8, further comprising filtering the tuples such that a training dataset includes only tuples whose reference source references the new source added to the knowledge base.

10. The method of claim 9, further comprising retraining the predictor model using the training dataset and deploying the retrained predictor model to an application.

11. A non-transitory storage medium having stored therein instructions that are executable by one or more hardware processors to perform operations for performing a retrieval augmented generation (RAG) operation in a RAG-based system, the operations comprising:

retrieving documents from one or more sources included in a knowledge base based on a query;

performing a weighted retrieval phase that is configured to re-rank the documents retrieved from a knowledge base based on inferred weights generated by a predictor model, wherein the inferred weights comprise per-source weights that correspond to individual sources in the knowledge base and are inferred by the predictor model from the query or a query embedding; and augmenting a prompt with the weighted documents such that the prompt includes a weighted context and the query wherein augmenting the prompt includes selecting top-K documents after applying the per-source weights to similarity scores of the retrieved documents; and generating a response to the query based on the prompt.

12. The non-transitory storage medium of claim 11, further comprising generating a query embedding from the query and comparing the query embedding with embeddings stored in a vector database to identify the documents retrieved from the knowledge base, wherein the retrieved documents include the documents that are most similar to the query.

13. The non-transitory storage medium of claim 11, wherein the predictor model comprises a continual learning based model.

14. The non-transitory storage medium of claim 11, wherein an original rank of each of the retrieved documents comprises a similarity score representing a similarity between the query and the corresponding retrieved document.

15. The non-transitory storage medium of claim 14, further comprising inferring the weights by inputting the query or a query embedding into the predictor model, wherein the output of the predictor model comprises an inferred weight for each of the sources in the knowledge base.

16. The non-transitory storage medium of claim 15, further comprising re-ranking the documents by multiplying each similarity score with a weight in the inferred weights that corresponds to the source of each of the documents.

17. The non-transitory storage medium of claim 11, further comprising retraining the predictor model.

18. The non-transitory storage medium of claim 17, further comprising, when a new source is added to the knowledge base, generating tuples that each include a synthetic question, a synthetic answer, and a reference source, wherein the reference source for each tuple is metadata that identifies which of the sources in the knowledge base contributed to the tuple.

19. The non-transitory storage medium of claim 18, further comprising filtering the tuples such that a training dataset includes only tuples whose reference source references the new source added to the knowledge base.

20. The non-transitory storage medium of claim 19, further comprising retraining the predictor model using the training dataset and deploying the retrained predictor model to an application.

* * * * *